United States Patent [19]
Van Beek et al.

[11] Patent Number: 4,783,384
[45] Date of Patent: Nov. 8, 1988

[54] ELECTROCHEMICAL CELL

[75] Inventors: Johann R. G. C. M. Van Beek; Gerrit Frens, both of Eindhoven, Netherlands

[73] Assignee: U.S. Philips Corporation, New York, N.Y.

[21] Appl. No.: 106,309

[22] Filed: Oct. 7, 1987

[30] Foreign Application Priority Data

Jul. 28, 1987 [NL] Netherlands .......... 8701778

[51] Int. Cl.$^4$ .............. H01M 4/58; H01M 4/74; H01M 4/82
[52] U.S. Cl. .................. 429/218; 429/94; 429/233; 429/241; 427/282; 141/1.1
[58] Field of Search .......... 429/94, 218, 233, 241; 427/282; 141/1.1

[56] References Cited

U.S. PATENT DOCUMENTS

| 4,033,803 | 7/1977 | Coder | 427/282 X |
| 4,082,875 | 4/1978 | Citron | 427/282 X |
| 4,487,817 | 12/1984 | Willems et al. | 429/27 |
| 4,622,277 | 11/1986 | Bedder et al. | 429/94 |
| 4,664,989 | 5/1987 | Johnson | 429/94 |

Primary Examiner—Brian E. Hearn
Assistant Examiner—Stephen J. Kalafut
Attorney, Agent, or Firm—Norman N. Spain

[57] ABSTRACT

Electrochemical cell comprising at least one electrode consisting of a substrate made of porous material which is impregnated with an electrochemically active material, highly efficient and high-speed gas reactions occurring at the electrode because of the fact that the substrate is impregnated in accordance with a pattern such that a portion of substrate surfaces contains free metal.

3 Claims, 1 Drawing Sheet

ELECTROCHEMICAL CELL

BACKGROUND OF THE INVENTION

The invention relates to an electrochemical cell comprising at least one electrode consisting of a substrate made of porous metal which is impregnated with an electrochemically active material.

The invention also relates to a method of producing such an electrochemical cell.

Examples of the use of electrochemical cells comprising such an electrode are fuel cells and sealed rechargeable cells.

U.S. Pat. No. 4,217,939 discloses an electrode made of a porous metal (foam metal or sponge metal) having interlinked pores, which are filled with an electrochemically active material in paste form. The electrode which is made of foam nickel filled with a nickel hydroxide-containing paste is suitable for use as the positive electrode in a rechargeable cell. The electrode is uniformly impregnated with the active material, the paste being provided, for example, at one side of the foam metal and is thereafter pressed therethrough. The porous metal is entirely filled with electrochemically active material and there is no free metal at the surface.

In several types of electrochemical cells reactions occur at the interface of a solid electrode, a liquid electrolyte and a gas present. That is, for example, the case not only in several types of fuel cells, but also in sealed rechargeable cells. In a gas-tight rechargeable nickel-cadmium cell or nickel-metal hydride cell oxygen recombination occurs at the negative electrode during excessive charging of the cell. In a nickel-metal hydride cell hydrogen recombination occurs at the positive electrode during excessive discharging of the cell. It is desirable for these reactions to proceed as rapidly as possible, for a fuel cell, because of the cell efficiency and for rechargeable cells because of their operating life, expressed in charging and discharging cycles. When in a rechargeable cell the recombination rate on charging or discharging is insufficient, the pressure in the cell increases. This may cause gas (possibly with electrolyte) to escape via a safety valve, which reduces the operating life and the capacity of the cell.

SUMMARY OF THE INVENTION

The invention has as its object to provide an electrode for an electrochemical cell, and also a method of producing such a cell, in which gas reactions occur at the electrode with high efficiency and at a high rate. The invention has more specifically for its object to provide a rechargeable cell with a long operating life, which may however not be obtained at the cost of the initial capacity and the loadability.

According to the invention, this object is achieved by an electrochemical cell of a type defined in the opening paragraph, this cell further being characterized in that the substrate material of the electrode is impregnated in accordance with a pattern such that a portion of the surfaces of the substrate is non-impregnated and therefore contains free metal.

DETAILED DESCRIPTION OF THE INVENTION

Figure 1:
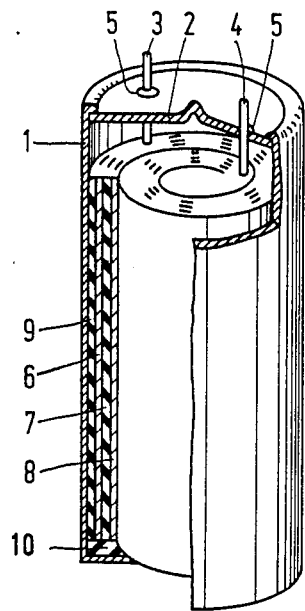
FIG. 1 is a view partially in cross-section and partially in elevation of a sealed rechargeable electrochemical cell according to the invention.

In a suitable embodiment of the electrochemical cell according to the invention the substrate of the electrode is designed as a flat plate which is impregnated at one side. The expression "flat" is used to indicate that the plate has no texture, for example a mesh structure. In use, the plate may be bent or rolled in any desired shape.

An electrode with locally very advantageous recombination properties is obtained when the substrate is a flat plate wherein portions are present at both sides which are not impregnated, this pattern being maintained during further processing operations on the electrodes, for example during rolling or further steps in which the electrodes are given their appropriate shapes.

A suitable, simple method of producing an electrochemical cell according to the invention, is characterized in that the electrode is produced by partly wrapping a non-porous material in the form of tape around the substrate, after which the electrochemically active material in paste form is pressed into the porous substrate, whereafter the tape material is removed.

The rate at which the above-mentioned interface reactions proceed depends inter alia on the size of the catalytic surface area present, i.e. the free metal surface of an electrode contacted by the gas. The quantity of active material which is decisive for the capacity of the cell must consequently not be too large. In addition there is the fact that, when a cell contains an excessive quantity of electrolyte or when the electrolyte is preferably bound by the electrode, the free metal surface is covered with liquid as a result of which the gas recombination rate is significantly reduced. On designing for example, a gas-tight rechargeable cell, compromises must be made between a high gas recombination rate, a high loadability and a large capacity.

This constitutes a problem, more specifically for cells having a nickel/nickel hydroxyde electrode as its positive electrode and a hydride-forming intermetallic compound as its negative electrode, since in such a cell no water transport takes place during the charging and discharging cycle. As a result thereof a mechanism which might ensure that the electrolyte periodically disappears from the electrodes is missing.

According to the invention, this problem is solved by producing an electrode having both hydrophilic and hydrophobic regions. Gas recombination requires pores in which gas, electrolyte and metal contact each other, and that is optimally the case on a surface having a transition from a hydrophilic to a hydrophobic character. Thus, the water produced during hydrogen recombination will, for example, not cover the free, active surface but will be conveyed to a more hydrophilic region.

The invention is based on constructing an electrode which is locally very suitable for gas recombination reactions and in other places behaves as a suitable electrode for a rechargeable cell. By separating these functions, better properties are obtained then with an electrode which evidences the same compromise of properties over the entire surface area. In addition, any changes in the hydrophilic character of the electrode during the operating life of a rechargeable cell will have a much lower influence or no influence on the gas recombination rate.

The invention and its advantages will now be described in greater detail with reference to the following embodiments and the accompanying drawing.

EXAMPLE OF A RECHARGEABLE CELL STRUCTURE

The cell which is shown in FIG. 1 and which is sealed from the air is made from a suitable housing 1 made of metal, for example stainless steel and provided with a cover 2 having apertures for the conductors 3 and 4. By means of synthetic resin material rings 5 the conductors are insulated from the metal housing (1,2). At the outside the housing may have, for example, a diameter of 22 mm and a height of 41 mm. A wound section consisting of a negative electrode 6, a separator 7 and a positive electrode 8 is provided within the housing, while the whole assembly is enveloped by an electrically insulating plastic film 9 of, for example, polyvinyl chloride and bears on a disc 10 made of an electrically insulating material, for example polyvinyl chloride.

The negative electrode 6 comprises a hydride-forming intermetallic compound and is connected to the conductor 3. The hydride-forming compound has, for example, the composition $La_{0.8}Nd_{0.2}Ni_{2.5}Co_{2.4}Si_{0.1}$. Further suitable hydride-forming compounds are described in, for example, U.S. Pat. No. 4,487,817. The negative electrode 6 is produced by fusing appropriate quantities of the relevant elements and pulverizing the intermetallic compound thus obtained and by applying it to a nickel substrate, for example with the aid of a polymer binder material such as polyvinylalcohol. The paste is, for example, composed of 75% by weight of the intermetallic compound, 24.5% by weight of water and 0.5% by weight of polyvinyl alcohol.

The positive electrode 8 is a nickel hydroxide electrode of the conventional sintered type, and is connected to the conductor 4. An aqueous 6N potassium hydroxide solution is used as the electrolyte. The electrolyte is absorbed in the separator 7 and is so contacted with the electrochemically active material of the two electrodes that it is wetted thereby. The separator is in the form of a non-woven sheet of polyamide fibres.

The free gas space in the cell is approximately 5 cm$^3$. A sealed cell of this type has an EMF of between 1.2 and 1.4 V. The cells in accordance with the invention can be assembled in a conventional manner to form batteries comprising, for example, a plurality of series-arranged cells.

It is possible to use the electrode improved in accordance with the invention in electrochemical cells other than the cells described in the foregoing. The cell may be in open connection with the atmosphere or may be sealed from the atmosphere. A cell sealed from the atmosphere may include a valve of such a dimension that it is made operative at a predetermined pressure.

In a rechargeable cell of the sealed type the electrochemical active portion of the positive electrode is made of, for example, nickel hydroxide, silver oxide or manganese oxide, nickel hydroxide generally being preferred for practical reasons.

The electrolyte used in the cell generally consists of a solution of one or more alkaline metal hydroxides, such as lithium hydroxide, sodium hydroxide and potassium hydroxide, having a pH exceeding 7.

In addition, the cell may include a separator which electrically insulates the electrodes, but permits ion and gas transport. The separator may consist of (woven or non-woven) synthetic resin material fibres, for example polyamide fibres or polypropylene fibres, and preferably has a hydrophylic character.

The improvement of an electrode according to the invention may both relate to the positive and to the negative electrode. An improvement of the negative electrode will be described in the following embodiments.

EMBODIMENT 1

An electrochemically active material for the negative electrode of the composition $La_{0.8}Nd_{0.2}Ni_{2.5}Co_{2.4}Co_{2.4}Si_{0.1}$ is prepared by mixing, fusing and pulverizing by means of repeated hydrogen adsorption and desorption of the required quantities of the different compounds. Thereafter the resultant material which with hydrogen is capable of forming a hydride is mixed with a binder, for example polyvinyl alcohol, which results in a paste. It is possible to substitute, for example, methyl cellulose for polyvinyl alcohol.

Figure 2A:
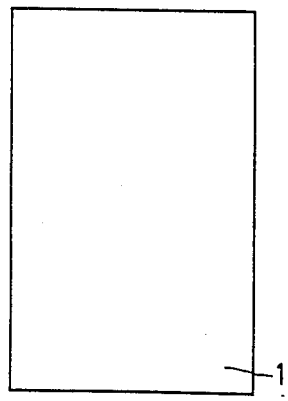
FIGS. 2a and 2b are respectively a schematic elevational view and a schematic cross-sectional view of an electrode for use in such a cell.

A porous nickel metal foil 11 having, for example, a thickness of 1.0 mm is thereafter impregnated at one side 12 with the paste, such that the other side of the foil 13 remains free of electrochemically active material and consequently has a free metal surface, see FIGS. 2a and b. This can be effected in a simple manner by, for example, applying the paste to one side of the foil and to press it into the foil.

The foil is subsequently built into an electrochemical cell, for example as described in the foregoing.

EMBODIMENT 2

Figures 2B, 3:
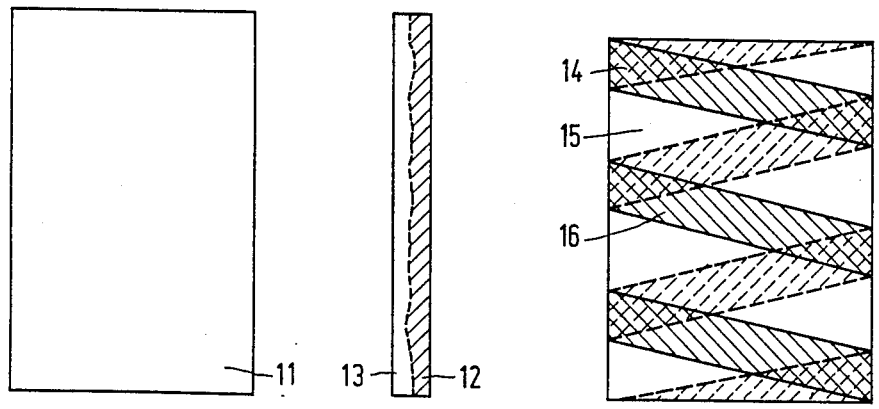
FIG. 3 is a schematic elevational view of a specific construction for use in a cell according to the invention.

FIG. 3 shows an alternative embodiment of a negative electrode for use in an electrochemical cell in accordance with the invention. A synthetic resin tape, having, for example, a width of 3 mm is helically wound around a plate or foil of porous nickel metal. Normal commercially available adhesive tape is suitable for this purpose. Thereafter both sides of the nickel foil are impregnated with the pastes described for the preceding embodiment, by applying the paste to the foil and by subsequent rolling of the assembly to, for example, a thickness of 0.5 mm. This results in the foil having regions 15 which are impregnated on both sides with electrochemically active material, but also regions 14 which are not impregnated at all. Between these regions there are regions 16 which contain electrochemically active material at one side. Thereafter the synthetic resin tape is removed and the electrode is ready for building into an electrochemical cell.

For the production of electrodes impregnated in accordance with a pattern, different suitable masking techniques or silk screening techniques may alternatively be used. A speckled pattern may be chosen for this purpose. It is alternatively possible to choose a striped pattern, for example horizontal or vertical stripes, to promote gas transport in a desired direction.

The pressure in a cell produced in accordance with this example measured after 25 charging and discharging cycles was found to be 0.15 MPa after 24 hours charging, both at a charging rate of 10% and at a charging rate of 20% of the capacity of the cell per hour.

COMPARATIVE EXAMPLE, NOT IN ACCORDANCE WITH THE INVENTION

A cell is produced in the manner as described for the embodiment 2, the difference being that during impregnation no tape was wound around the porous nickel metal. The electrode is fully impregnated and has no free metal surface.

Measurements on this cell which was not produced in accordance with the invention showed that after 25 charging and discharging cycles the pressure in the cell is 0.50 and 0.80 MPa after 24 of hours of charging, at charging rates of 10% and 20%, respectively, of the capacity of the cell per hour.

The electrochemical cells according to the invention have a high capacity and loadability and a long operating life, that is to say they can be charged and discharged a large number of times, without a reduction in their serviceability. More specifically, the operating life is hardly negatively affected by overcharging or overdischarging at high rates.

The examples specifically refer to electrochemical cells where hydride forming materials are employed as electrochemically active material for one of the electrodes. However, the invention can also be applied with other electrochemically active materials, for example for nickel electrodes covered with a nickel hydroxide-containing paste.

What is claimed is:

1. An electrochemical cell comprising a positive electrode and a negative electrode, said negative electrode being formed of a substrate made of a porous metal impregnated according to a pattern with an intermetallic compound capable of forming a hydride with hydrogen in a manner such that a portion of the surfaces of the substrate is non-impregnated.

2. An electrochemical cell as claimed in claim 1, the substrate being a flat plate wherein portions are present which are non-impregnated on both sides.

3. A method of producing an electrochemical cell comprising a positive electrode and a negative electrode consisting of a substrate made of porous metal impregnated with an intermetallic compound capable of forming a hydride with hydrogen, said method comprising partially enveloping said substrate with a non-porous tape, pressing said intermetallic compound into said tape enveloped substrate and then removing said tape from said substrate.

* * * * *